(12) United States Patent
Cherbakov et al.

(10) Patent No.: US 8,626,738 B2
(45) Date of Patent: Jan. 7, 2014

(54) INTEREST CONTOUR COMPUTATION AND MANAGEMENT BASED UPON USER AUTHORED CONTENT

(75) Inventors: Luba Cherbakov, McLean, VA (US); Tolga Oral, Winchester, MA (US); Aroopratan D. Pandya, Hughsonville, NY (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 13/018,001

(22) Filed: Jan. 31, 2011

(65) Prior Publication Data
US 2012/0197860 A1 Aug. 2, 2012

(51) Int. Cl.
*G06F 17/30* (2006.01)

(52) U.S. Cl.
USPC .......................................................... 707/709

(58) Field of Classification Search
USPC .......... 707/751, 709; 709/204, 229; 715/769; 706/46
See application file for complete search history.

(56) References Cited

U.S. PATENT DOCUMENTS

| | | | |
|---|---|---|---|
| 7,200,592 B2 * | 4/2007 | Goodwin et al. | 706/46 |
| 2005/0021784 A1 * | 1/2005 | Prehofer | 709/229 |
| 2006/0187026 A1 * | 8/2006 | Kochis | 340/539.13 |
| 2008/0040301 A1 * | 2/2008 | Sadagopan et al. | 706/16 |
| 2008/0104172 A1 * | 5/2008 | Craig | 709/204 |
| 2008/0301228 A1 * | 12/2008 | Flavin | 709/204 |
| 2009/0043789 A1 * | 2/2009 | Gupta | 707/100 |
| 2009/0254534 A1 * | 10/2009 | Garbow et al. | 707/5 |
| 2010/0169324 A1 * | 7/2010 | Shnitko et al. | 707/748 |
| 2011/0055229 A1 * | 3/2011 | Kumar | 707/751 |
| 2011/0107245 A1 * | 5/2011 | Dantzler et al. | 715/769 |

* cited by examiner

*Primary Examiner* — Etienne LeRoux
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for interest contour computation and management based upon user generated content and associated meta-data. In an embodiment of the invention, an interest contour computation and management method is provided. The method includes crawling content sources disposed about a computer communications network for authored content created by an end user. The method further includes identifying meta data provided for the authored content and adding the meta data to a user interests profile of the end user. The meta-data further can include extracted text from the content. Of note, the method can further include receiving from the end user a specified time period and limiting the addition of the meta data to meta data applied to the authored content during the specified time period.

19 Claims, 1 Drawing Sheet

INTEREST CONTOUR COMPUTATION AND MANAGEMENT BASED UPON USER AUTHORED CONTENT

BACKGROUND OF THE INVENTION

1. Field of the Invention

The present invention relates to user profiling and more particularly to generating a user interests profile based upon the computing behavior of a corresponding user.

2. Description of the Related Art

Content browsing refers to the retrieval of content from a content source through a content browser from over a computer communications network. The most common form of content browsing pertains to Web page retrieval from the World Wide Web of documents, known by most as simply the "Web". A large portion of the Web incorporates personalized delivery of content. Personalization ranges from recalling basic personal information such as name and address to consummate an e-commerce transaction, to complex and detailed demographic data and psychographic data such as attributes relating to personality, values, attitudes, interests, musical tastes, travel preferences, or lifestyles. Content personalization more recently has acted as a filter to the vast amount of information accessible over the global Internet. Specifically, the vast amount of information can result in "information overload" for the end user.

To facilitate the personalization of content delivery to different individuals, for more than a decade content providers have utilized the venerable "cookie". A "cookie" as it is well known in the art is a text string stored by a Web browser. A cookie consists of one or more name-value pairs containing bits of information, which may be encrypted for information privacy and data security purposes. In operation, the cookie is sent as a hypertext transfer protocol (HTTP) header by a web server to a web browser and then sent back unchanged by the Web browser each time the Web browser accesses the Web server.

Despite the desirability of content personalization, many end users of the Web have grown to mistrust the use of the cookie. This mistrust will be apparent in the embedded "disable cookie" feature of most commercially available content browsers. Yet, much of this mistrust is misguided because as text, cookies are not executable and since cookies are not executed, cookies cannot replicate themselves and are not viruses. However, due to the content browser mechanism to set and read cookies, cookies can be used as spyware. In fact, modern anti-spyware applications warn end users about some cookies because cookies can be used to track end users—a privacy concern. Thus, while most modern content browsers permit the end user to opt to reject the use of cookies, or more reasonably, a time period during which a cookie is to be maintained, rejecting cookies renders some Web sites unusable.

User profiling provides a way for end users to experience personalized content with respect to content consumption over the computer communications network without relying upon the use of the venerable cookie. A user interests profile also referred to as an interest contour is a collection of personal data associated with a specific user. User profiling refers to the process of constructing a profile based upon a set of data associated with a target user. The user interests profile when accessed by a content provider, in turn, can provide personalized content to the target user. Web personalization models include rules-based filtering, based on "if this, then that" rules processing, and collaborative filtering, which serves relevant material to customers by combining their own personal preferences with the preferences of like-minded others.

Modern user profiling systems, implemented in an attempt to address information overload, are not adequate for delivering content which is relevant to the user, the interests of the user and the assignments or roles of the user. In this regard, user profiling systems generally rely upon the selection of interests by the user from a list of various interests. The user profiling systems then rely upon the user to maintain the accuracy and relevancy of the profile interests or career roles of the user change. Further, modern user profiling systems often require the user to complete multiple profile/interest lists. This leaves the user dissatisfied as in an enterprise environment the user expects that the enterprise applications will be interconnected and should be able to "net out" the user's interests based on the history of the activities, assignments, usage patterns and social networks of the end user. In addition, the user may not fully understand the taxonomy that underpins the selection of interests in various enterprise applications that can use different terminology to describe similar areas of interest. Historically, this approach has proven to be ineffective with profile/interest lists quickly becoming outdated.

BRIEF SUMMARY OF THE INVENTION

Embodiments of the present invention address deficiencies of the art in respect to user profiling and provide a novel and non-obvious method, system and computer program product for interest contour computation and management based upon user generated content. In an embodiment of the invention, an interest contour computation and management method is provided. The method includes crawling content sources disposed about a computer communications network for authored content created by an end user. The method further includes identifying meta data such as tags or keywords provided by other end users for the authored content and adding the meta data to a user interests profile of the end user. Of note, the method can further include receiving from the end user a specified time period and limiting the addition of the meta data to the user interests profile to only the meta data applied to the authored content during the specified time period.

In one aspect of the embodiment, the method also can include identifying names of other end users interacting with the authored content, validating the identified names against a directory of names and then adding only meta-data provided by validated ones of the identified names to the user interests profile. In another aspect of the embodiment, the method can additionally include providing access to the user interests profile to the end user and modifying the user interests profile according to deletions of added interests in the user interests profile specified by the end user through the provided access or according to additions of interests to the user interests profile specified by the end user through the provided access.

In another embodiment of the invention, a user profiling data processing system is provided. The system includes a host server with at least one processor and memory. The host server is configured for coupling over a computer communications network such as a private Intranet or global Internet to different content sources serving authored content to requesting clients over the network. A crawler can execute in the memory of the host server and can crawl the content sources to retrieve authored content into a database. Finally, an interest contour module can execute in the memory of the host server. The module can include program code that when executed identifies meta data provided for authored content in the database that had been created by an end user, and adds the meta data to a user interests profile of the end user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for interest contour computation and management based upon user generated content. In accordance with an embodiment of the invention, content authored by a user and disposed in fixed storage in a computer communications network such as the Internet can be identified. The content can include by way of example, blog postings of the user, wiki entries authored by the user, published papers, articles, forum posts and the like. The identified content can be retrieved and stored for analysis. During analysis, meta-data including tags or keywords applied to the identified content can be extracted as can terms from the content itself. Finally, a time stamp for the meta-data can be stored in connection with the identified content. Thereafter, a user interests profile for the user can be computed from the meta-data for a period of time specified by the user. Also, social relationships can be determined for the user by identifying other users whom have interacted with the identified content. In this way, the user interests profile for the user can remain fresh and relevant and can be tuned by the user by selecting a time period to filter the computed data requisite to establishing the user interests profile.

Figure 1:
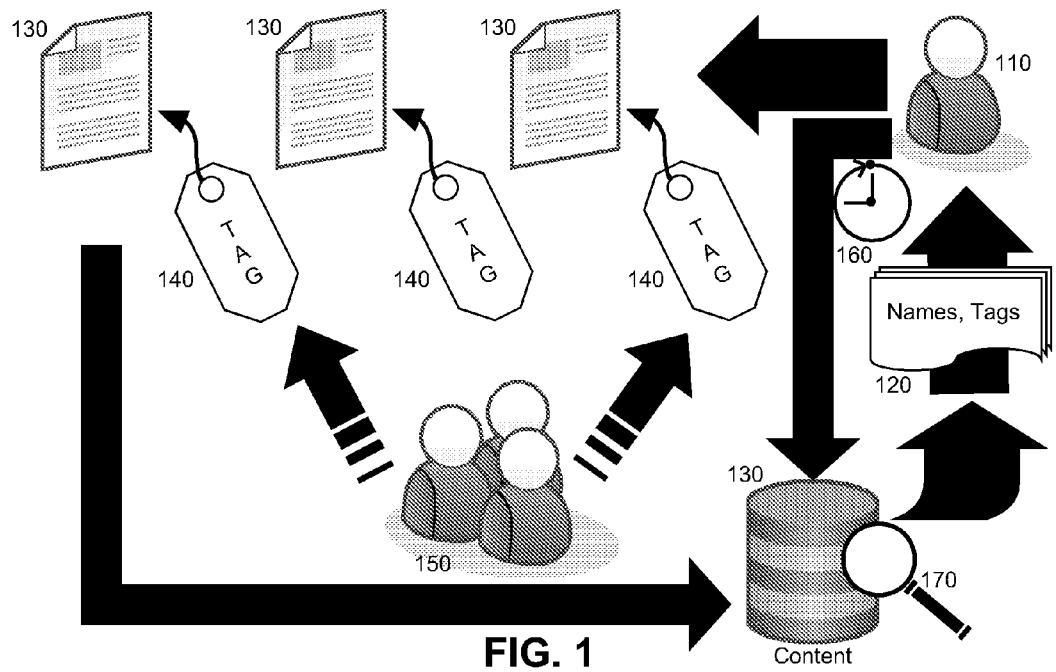
FIG. 1 is a pictorial illustration of a process for interest contour computation and management based upon user generated content.

In further illustration, FIG. 1 pictorially shows a process for interest contour computation and management based upon user-generated content. As shown in FIG. 1, content 130 authored by user 110 and disposed about a computer communications network such as an enterprise Intranet or the global Internet can be identified as having been authored by the user 110 and retrieved into storage. Thereafter, meta-data 140 including tags or keywords applied to the content 130 by other users 150 can be identified in the content 130 now disposed in storage. A time period 160 can be specified by the user 110 to filter the meta-data 140 to that of meta-data 140 applied to the content 130 within the specified time period 160.

Subsequently, names of the users 150 associated with the content 130 (such as those who have commented, downloaded, modified or rated the content 130) can be associated with the user 110 in a user interests profile 120 for the user 110 as can a normalized set of meta-data 140 applied to the content 130 by the other users 150. Using the names of the other users 150 and the normalized set of meta-data 140, one or more interests corresponding to the meta-data 140 applied to the content 130 by the other users 150 can be set forth in the user interests profile 120. Yet further, the user 110 can modify the user interests profile 120 directly by adding or deleting interests in the user interests profile 120.

Figure 2:
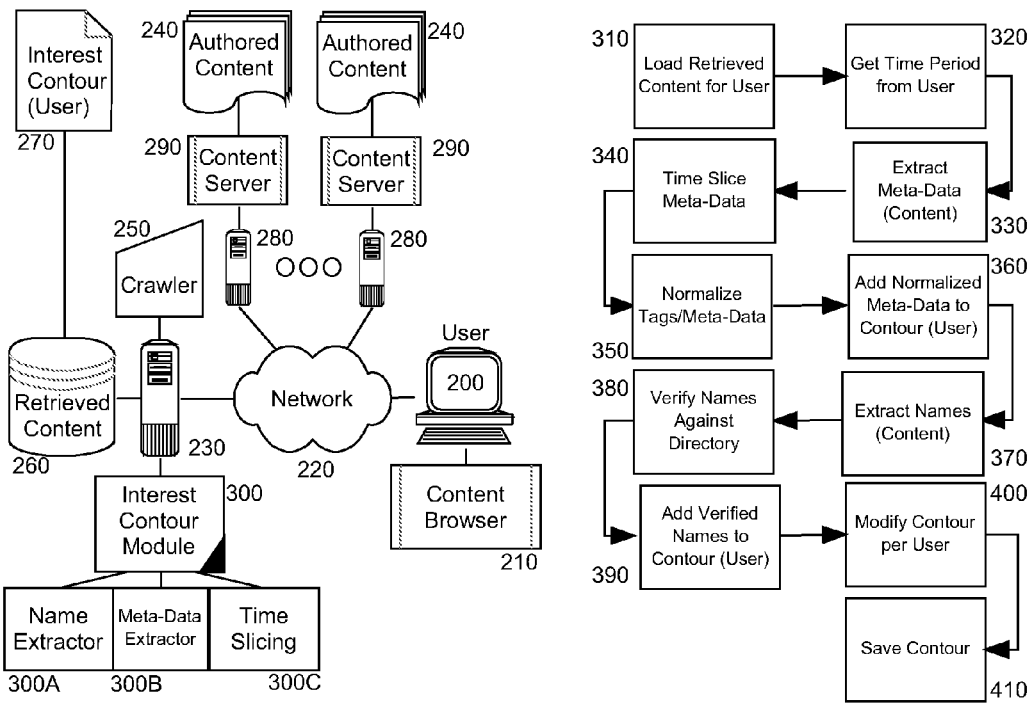
FIG. 2 is a schematic illustration of a user profiling data processing system configured for interest contour computation and management based upon user generated content; and, FIG. 3 is a flow chart illustrating a process for interest contour computation and management based upon user generated content.

The process described in connection with FIG. 1 can be implemented within a user profiling data processing system. In yet further illustration, FIG. 2 schematically shows a user profiling data processing system configured for interest contour computation and management based upon user generated content. The system can include a host server 230 with at least one processor and memory configured for communicative coupling to a computer communications network 220, such as a private Intranet or global Internet. Different content hosts 280 can be coupled to the computer communications network 220, and each of the content hosts 280 can be configured to store and distribute authored content 240 such as blog postings, wiki contributions, published papers, government documents, bulletin board postings, and the like. The authored content 240 can be associated with an authoring user and also the commentary, edits, ratings, tags, or other like meta-data applied to the authored content 240 by the other users.

The host server 230 can support the execution in memory of a crawler 250. The crawler 250 can scan the computer communications network 220 to identify and retrieve the authored content 240 from respective ones of the content servers 290 and store the retrieved authored content 240 as a user interest contour 270 into non-volatile storage 260, such as a database. Of note, the host server 230 also can support the execution of an interest contour module 300. The interest contour module 300 can include program code that when executing in the memory of the host server 230 can process the authored content 240 stored in storage 260 to extract names of other end users associated with the authored content 240, meta-data applied to the authored content 240 by the other end users, and meta-data included in the authored content 240. The extracted names and meta-data, in turn, can be included in an interest contour for the end user responsible for having created the authored content 240, or mapped to interests for inclusion in the interest contour for the end user.

Specifically, the program code of the interest contour module 300 can include a name extractor 300A enabled to extract the associated names from the authored content 240, a meta-data extractor 300B enabled to extract meta-data such as keywords or tags applied to the authored content 240, and also time slicing logic 300C. The time slicing logic 300C can be enabled to receive a directive from a user through an interface over the computer communications network 220 and coupled computer 200 with content browser 210. The directive can include a time period for meta-data to be considered in generating an interest contour—namely a user interests profile—for the end user. In this regard, using the specified time period, the time slicing logic 300C can limit the interest contour module 300 in generating a user interests profile to consider only meta-data for the authored content 240 applied to the authored content 240 during the specified time period.

Figure 3:
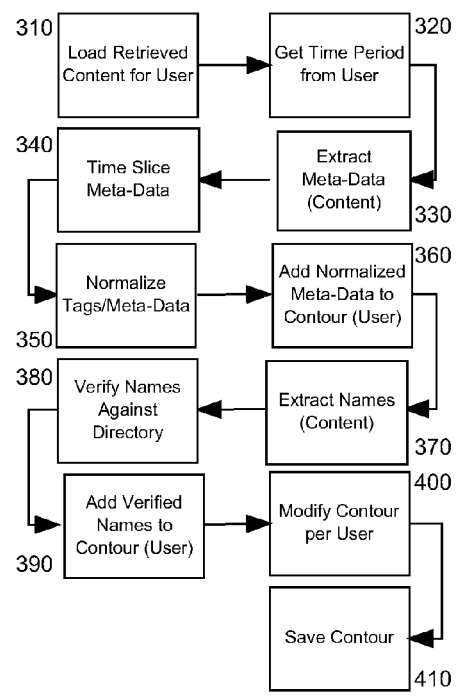

In even yet further illustration of the operation of the interest contour module 300, FIG. 3 is a flow chart illustrating a process for interest contour computation and management based upon user-generated content. Beginning in block 310, content authored by an end user can be retrieved from a computer communications network by way of a crawling operation. In block 320, a time period can be specified by the authoring end user, and in block 330 meta-data such as keywords or tags applied to the content can be extracted. In block 340, the meta-data can be limited to that meta-data applied to the authored content during the time period. Thereafter, in block 350 the extracted meta-data can be normalized to remove redundancies. Optionally, meta-data considered to be synonymous can be collapsed into a single representation of the synonymous meta-data as the case may be. In block 360, the normalized meta-data can be added for consideration in producing the interest contour for the end user directly or by mapping the normalized meta-data to a set of interests.

In block 370, names associated with the time sliced content can be extracted from the time sliced content, such as names of other end users who have provided responses to, comments about, ratings of, or modifications to the time sliced content. In block 380, the names can be filtered to include only those names verified within a directory for the network and in block 390 the meta-data provided only by those names verified within the directory can be added directly to the interest contour or the names can be used in consideration of producing the interest contour for the end user by mapping the names to a set of interests such as those of the other end users associated with the names.

In block 400 the interest contour can be modified by the end user by adding, removing or modifying the interests in the interest contour. Finally, in block 410 the interest contour can be saved for use as a user interests profile of the end user in suggesting content for retrieval from over the network and review by the end user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. An interest contour computation and management method comprising:
    crawling content sources disposed about a computer communications network for both authored content created exclusively by an end user and also by the end user and other end users;
    identifying meta-data provided for the authored content; and,
    adding the meta-data to a user interests profile of the end user.

2. The method of claim 1, further comprising:
    receiving from the end user a specified time period; and,
    limiting the addition of the meta-data to the user interests profile to meta-data provided for the authored content during the specified time period.

3. The method of claim 1, further comprising:
    identifying names of other end users interacting with the authored content;
    validating the identified names against a directory of names; and,
    adding only meta-data authored by validated ones of the identified names to the user interests profile.

4. The method of claim 1, further comprising:
    providing access to the user interests profile to the end user; and,
    modifying the user interests profile according to deletions of added interests in the user interests profile specified by the end user through the provided access.

5. The method of claim 1, further comprising:
    providing access to the user interests profile to the end user; and,
    modifying the user interests profile according to additions of interests to the user interests profile specified by the end user through the provided access.

6. The method of claim 1, further comprising:
    mapping the meta-data to a set of pre-specified interests; and,
    adding the mapped pre-specified interests to a user interests profile of the end user.

7. A user profiling data processing system comprising:
    a host server with at least one processor and memory, the host server being configured for coupling over a computer communications network to a plurality of content sources serving authored content to requesting clients over the network;
    a crawler executing in the memory of the host server and crawling the content sources to retrieve both authored content created exclusively by an end user and also by the end user and other users into a database; and,
    an interest contour module executing in the memory of the host server, the module comprising program code that when executed identifies meta-data provided for authored content in the database that had been created both exclusively by the end user and also by the end user and other end users, and adds the meta-data to a user interests profile of the end user.

8. The system of claim 7, wherein the meta-data comprises tags applied to the authored content by other end users.

9. The system of claim 7, wherein the meta-data comprises keywords applied to the authored content.

10. The system of claim 7, wherein the meta-data comprises text extracted from the authored content.

11. The system of claim 7, wherein the program code of the module is further enabled to receive from the end user a specified time period and limit the addition of the meta-data to meta-data applied to the authored content during the specified time period.

12. The system of claim 7, wherein the program code of the module is further enabled to identify names of other end users interacting with the authored content, to validate the names of the other end users with a directory, and to add meta-data to the user interests profile of the end user only for meta-data provided by validated ones of the names.

13. The system of claim 7, wherein the program code of the module is further enabled to provide access to the user interests profile to the end user and modify the user interests profile according to deletions of added interests in the user interests profile specified by the end user through the provided access.

14. The system of claim 7, wherein the program code of the module is further enabled to provide access to the user interests profile to the end user and modify the user interests profile according to additions of interests to the user interests profile specified by the end user through the provided access.

15. A computer program product for interest contour computation and management, the computer program product comprising:
- a computer readable storage medium having computer readable program code embodied therewith, the computer readable program code comprising:
- computer readable program code for crawling content sources disposed about a computer communications network for both authored content created exclusively by an end user and also by the end user and other end users;
- computer readable program code for identifying meta-data applied to the authored content; and,
- computer readable program code for adding the meta-data to a user interests profile of the end user.

16. The computer program product of claim 15, further comprising:
- computer readable program code for receiving from the end user a specified time period; and,
- computer readable program code for limiting the addition of the meta-data to meta-data applied to the authored content during the specified time period.

17. The computer program product of claim 15, further comprising:
- computer readable program code for identifying names of other end users interacting with the authored content;
- computer readable program code for validating the identified names against a directory of names; and,
- computer readable program code for adding only meta-data authored by validated ones of the identified names to the user interests profile.

18. The computer program product of claim 15, further comprising:
- computer readable program code for providing access to the user interests profile to the end user; and,
- computer readable program code for modifying the user interests profile according to deletions of added interests in the user interests profile specified by the end user through the provided access.

19. The computer program product of claim 15, further comprising:
- computer readable program code for providing access to the user interests profile to the end user; and,
- computer readable program code for modifying the user interests profile according to additions of interests to the user interests profile specified by the end user through the provided access.

* * * * *